(12) United States Patent
Huntley et al.

(10) Patent No.: US 9,148,523 B2
(45) Date of Patent: Sep. 29, 2015

(54) METHOD AND APPARATUS FOR MANAGING A NETWORK

(75) Inventors: Brian P. Huntley, Bellingham, MA (US); Jimmy E. Bodkin, O'Fallon, MO (US); Clifton L. DeBlasio, Hackettstown, NJ (US); Marc Thurston, Washington, MO (US); Brian Young, Covington, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 797 days.

(21) Appl. No.: 12/753,296

(22) Filed: Apr. 2, 2010

(65) Prior Publication Data

US 2011/0243124 A1 Oct. 6, 2011

(51) Int. Cl.
| | |
|---|---|
| H04L 12/02 | (2006.01) |
| H04M 3/42 | (2006.01) |
| H04L 12/66 | (2006.01) |
| H04M 15/00 | (2006.01) |
| H04L 12/24 | (2006.01) |
| H04L 12/14 | (2006.01) |
| H04L 12/26 | (2006.01) |
| H04W 24/04 | (2009.01) |

(52) U.S. Cl.
CPC .............. *H04M 15/73* (2013.01); *H04L 41/22* (2013.01); *H04M 15/00* (2013.01); *H04M 15/41* (2013.01); *H04M 15/51* (2013.01); *H04M 15/58* (2013.01); *H04M 15/70* (2013.01); *H04M 15/72* (2013.01); *H04M 15/725* (2013.01); *H04L 12/14* (2013.01); *H04L 43/16* (2013.01); *H04W 24/04* (2013.01)

(58) Field of Classification Search
CPC ........................... H04L 43/16; H04L 12/2634
See application file for complete search history.

(56) References Cited

U.S. PATENT DOCUMENTS

| | | | | |
|---|---|---|---|---|
| 5,999,604 | A * | 12/1999 | Walter .......................... | 379/133 |
| 6,411,681 | B1 * | 6/2002 | Nolting et al. ............... | 379/1.01 |
| 6,704,289 | B1 * | 3/2004 | D'Souza et al. .............. | 370/252 |
| 2004/0023655 | A1 * | 2/2004 | Hoy et al. ..................... | 455/445 |
| 2004/0208128 | A1 * | 10/2004 | Lu et al. ........................ | 370/238 |
| 2006/0034187 | A1 * | 2/2006 | Pack .............................. | 370/252 |
| 2008/0170680 | A1 * | 7/2008 | Gibson .................... | 379/211.02 |
| 2010/0061255 | A1 * | 3/2010 | Lai et al. ....................... | 370/252 |

* cited by examiner

*Primary Examiner* — Wutchung Chu
*Assistant Examiner* — Jason Harley

(57) ABSTRACT

A method and an apparatus for managing a network are disclosed. For example, the method collects a plurality of call detail records (CDRs), and organizes one or more parameters of the CDRs in accordance with a plurality of cause codes. The method displays the one or more parameters of the CDRs in a hierarchical representation comprising a plurality of screen displays.

13 Claims, 8 Drawing Sheets

| | 00 | 01 | 02 | 03 | 04 | 05 | 06 |
|---|---|---|---|---|---|---|---|
| 20090331 | 100.000 | 100.000 | 100.000 | 100.000 | 100.000 | 100.000 | 99.840 |
| 20090401 | 99.999 | 100.000 | 100.000 | 100.000 | 100.000 | 99.942 | 100.000 |
| 20090402 | 100.000 | 100.000 | 99.915 | 100.000 | 100.000 | 100.000 | 98.397 |
| 20090403 | 100.000 | 100.000 | 100.000 | 100.000 | 100.000 | 100.000 | 100.000 |
| 20090404 | 100.000 | 100.000 | 100.000 | 100.000 | 99.819 | 100.000 | 100.000 |
| 20090405 | 100.000 | 100.000 | 100.000 | 100.000 | 99.899 | 99.874 | 99.994 |
| 20090406 | 100.000 | 100.000 | 100.000 | 100.000 | 99.863 | 100.000 | 100.000 |
| 20090407 | 100.000 | 100.000 | 99.516 | 100.000 | 100.000 | 100.000 | 99.713 |
| 20090408 | 100.000 | 100.000 | 99.946 | 100.000 | 100.000 | 100.000 | 100.000 |

Table 310:

| | ATTEMPTS PER DAY | DEFECTS PER DAY | P-DPM | S-DPM |
|---|---|---|---|---|
| 20090331 | 4522213 | 65 | 14.373 | 14.373 |
| 20090401 | 4609010 | 560 | 121.501 | 121.501 |
| 20090402 | 4531083 | 1401 | 309.198 | 785.463 |
| 20090403 | 4592665 | 28 | 6.097 | 6.097 |
| 20090404 | 3767152 | 6 | 1.593 | 1.593 |
| 20090405 | 2961762 | 143 | 48.282 | 48.282 |
| 20090406 | 4495650 | 110 | 24.468 | 110.551 |
| 20090407 | 4652165 | 949 | 203.991 | 203.991 |
| 20090408 | 1452157 | 143 | 98.474 | 98.474 |

Table 320 — SUCCESSFUL CALL PERCENTAGE:

| 07 | 08 | 09 | 10 | 11 | 12 | 13 | 14 | 15 | 16 | 17 |
|---|---|---|---|---|---|---|---|---|---|---|
| 99.919 | 99.814 | 99.919 | 100.000 | 99.936 | 100.000 | 100.000 | 100.000 | 100.000 | 100.000 | 100.000 |
| 99.985 | 99.897 | 99.855 | 100.000 | 100.000 | 100.000 | 100.000 | 100.000 | 100.000 | 100.000 | 100.000 |
| 96.353 | 99.604 | 99.065 | 99.853 | 100.000 | 100.000 | 100.000 | 100.000 | 100.000 | 99.964 | 100.000 |
| 99.857 | 99.805 | 99.888 | 100.000 | 100.000 | 100.000 | 100.000 | 100.000 | 100.000 | 100.000 | 100.000 |
| 100.000 | 100.000 | 100.000 | 99.950 | 100.000 | 100.000 | 100.000 | 100.000 | 99.996 | 100.000 | 100.000 |
| 100.000 | 99.896 | 100.000 | 99.653 | 100.000 | 100.000 | 99.999 | 100.000 | 100.000 | 100.000 | 100.000 |
| 99.888 | 100.000 | 100.000 | 99.802 | 100.000 | 99.999 | 100.000 | 100.000 | 100.000 | 100.000 | 100.000 |
| 99.829 | 99.789 | 99.952 | 99.957 | 100.000 | 100.000 | 99.999 | 100.000 | 100.000 | 100.000 | 100.000 |
| 99.985 | 99.348 | 99.935 | 100.000 | 100.000 | 100.000 | 100.000 | 100.000 | 100.000 | 100.000 | 100.000 |

| | 20090407 0615 | | | 20090407 0620 | | | 20090407 0625 | | | 20090407 0630 | | | HELP — 432 |
|---|---|---|---|---|---|---|---|---|---|---|---|---|---|
| | 1032 | | | 976 | | | 963 | | | 909 | | | |
| | COUNT | % | DPM | COUNT | % | DPM | COUNT | % | DPM | COUNT | % | DPM | |
| 911 CALLS | | | | | | | | | | | | | |
| | 2 | 0.194 | | 3 | 0.307 | | | | | 3 | 0.330 | | |
| | 2 | 0.194 | | | | | 1 | 0.104 | | 1 | 0.110 | | |
| SIP TO PSTN | | | | | | | | | | | | | |
| | 527 | 51.066 | | 506 | 51.844 | | 468 | 48.598 | | 434 | 47.745 | | |
| | 4 | 0.388 | | 2 | 0.205 | | 3 | 0.312 | | 3 | 0.330 | | |
| | 1 | 0.097 | | 1 | 0.102 | | 4 | 0.415 | 4153.7 | | | | |
| | 1 | 0.097 | | | | | | | | | | | |
| | 148 | 14.341 | | 119 | 12.193 | | 133 | 13.811 | | 124 | 13.641 | | |
| | 3 | 0.291 | | 2 | 0.205 | | 2 | 0.208 | | 5 | 0.550 | | |

NOW SEARCHING DATA 20090407 AND TIME 0610
FOR DISCONNECT CODE 10102 AND A DIRECTION OF 110

| 501 | 502 | 503 | 504 | 505 | 506 | 507 | 508 | 509 |
|---|---|---|---|---|---|---|---|---|
| # | NODE | TYPE | ANS | ONPA | ONUM | OVS | TNPA | TNUM |
| 1 | PH3 | 110 | 0 | 815 | 777-7777 | 0 | 00314 | 777-7777 |
| 2 | PH3 | 110 | 0 | 734 | 111-1111 | 0 | 00313 | 111-1111 |
| 3 | PH3 | 110 | 0 | 708 | 222-2222 | 0 | 00773 | 222-2222 |
| 4 | PH3 | 110 | 0 | 616 | 333-3333 | 0 | 00269 | 333-3333 |
| 5 | PH3 | 110 | 0 | 414 | 444-4444 | 0 | 00414 | 444-4444 |
| 6 | PH3 | 110 | 0 | 614 | 555-5555 | 0 | 00614 | 555-5555 |
| 7 | PH3 | 110 | 0 | 313 | 666-6666 | 0 | 00770 | 666-6666 |
| 8 | PH3 | 110 | 0 | 248 | 777-7777 | 0 | 00651 | 777-7777 |
| 9 | PH3 | 110 | 0 | 937 | 888-8888 | 0 | 00888 | 888-8888 |
| 10 | PH3 | 110 | 0 | 734 | 999-9999 | 0 | 00734 | 999-9999 |
| 11 | PH3 | 110 | 0 | 708 | 000-0000 | 0 | 00708 | 000-0000 |
| 12 | PH3 | 110 | 0 | 262 | 111-1111 | 0 | 00262 | 111-1111 |
| ... 20 | | | | | | | | |

HELP INFO
GO BACK...
SHOW RAW RECORDS ← 530

500

| CTIME | DUR | DTIME | ITG | OTG | O-CIC | LSM | MG | SBC | CUSTOMER ID |
|---|---|---|---|---|---|---|---|---|---|
| 04:46:46.1 | 82:40:9 | 6:09:27.0 | 007000 | 001063 | 0000090 | PH-1-12 | PH-02-1 | EASTAD-IN | ABC COMPANY |
| 05:04:27.7 | 65:00.8 | 6:09:28.5 | 007000 | 001022 | 0000090 | PH-1-12 | PH-01-3 | EASTAE-IN | ABC COMPANY |
| 05:27:34.3 | 41:54.8 | 6:09:29.1 | 007000 | 001007 | 0000186 | PH-1-11 | PH-01-3 | EASTAF-IN | ABC COMPANY |
| 05:15:17.9 | 54:12.7 | 6:09:30.6 | 007000 | 005000 | 0002948 | PH-2-11 | PH-02-1 | EASTAG-IN | ABC COMPANY |
| 06:03:25.6 | 6:10.3 | 6:09:35.9 | 007000 | 001046 | 0000158 | PH-1-12 | PH-01-3 | EASTAE-IN | ABC COMPANY |
| 05:03:46.1 | 65:50.8 | 6:09:36.9 | 007000 | 001074 | 0002496 | PH-1-08 | PH-02-4 | EASTAA-IN | EFG COMPANY |
| 06:07:01.2 | 2:40.3 | 6:09:41.5 | 007000 | 005000 | 0001651 | PH-1-05 | PH-02-1 | EAST-IN | EFG COMPANY |
| 05:58:48.3 | 10:51.4 | 6:09:39.7 | 007000 | 005000 | 0003239 | PH-1-09 | PH-01-4 | EASTAB-IN | EFG COMPANY |
| 05:59:30.0 | 10:09.8 | 6:09:39.8 | 007000 | 003023 | 0000157 | PH-1-05 | PH-01-4 | EASTAF-IN | JOHN DOE |
| 06:06:27.4 | 3:13.8 | 6:09:41.2 | 007000 | 001070 | 0000089 | PH-2-09 | PH-02-2 | EASTAG-IN | JOHN DOE |
| 04:52:25.6 | 77:17.3 | 6:09:42.9 | 007000 | 001035 | 0000030 | PH-1-09 | PH-01-2 | EASTAH-IN | PAUL DOE |
| 04:14:43.4 | 115:01.4 | 6:09:44.8 | 007000 | 001047 | | | | | |

510 511 512 513 514 515 516 517 518 519

500

METHOD AND APPARATUS FOR MANAGING A NETWORK

The present disclosure relates generally to communication networks and, more particularly, to a method and apparatus for managing a network, e.g., an Internet Protocol (IP) network, an Internet Protocol (IP) Multimedia Subsystem (IMS) network, a Voice over Internet Protocol (VoIP) network, and the like.

BACKGROUND

Communications services provided over an IP network is gaining wide acceptance by consumers. To ensure communication services are meeting the demands or negotiated service levels requested by the consumers, it is necessary to quickly resolve any defects or failures that may impact the communication services provided to the consumers by a service provider. In some instances, these consumers are large enterprise customers, such as large corporations, where a service disruption or even a service degradation may negatively impact the enterprise customers' business operations. Thus, a service provider will need to monitor and manage the underlying IP network to quickly detect occurrences of defects and/or failures so that proper remedial actions can be quickly taken to minimize any impacts to the services provided to the customers of the service provider.

Unfortunately, given the complexity of the core IP network, the various access networks and the equipment deployed at the customer premises, it is often very difficult to quickly isolate a defect or a set of defects to a particular root cause without a substantial amount of time that must be expended, e.g., by a technician who must consult with a plurality of sources before the problem can be isolated. For example, the problem can be located within the IP network itself, can be located within an access network that is external to the core IP network, or the problem can be located within equipment deployed at the customer premises. As such, a technician may need to consult with various systems before a root cause can be properly isolated and for corrective action to begin. To ensure customer satisfaction is maintained, the delay in isolating the root cause of a defect or failure should be minimized.

SUMMARY

In one embodiment, the present disclosure describes a method and an apparatus for managing a network. For example, the method collects a plurality of call detail records (CDRs), and organizes one or more parameters of the CDRs in accordance with a plurality of cause codes. The method displays the one or more parameters of the CDRs in a hierarchical representation comprising a plurality of screen displays.

BRIEF DESCRIPTION OF THE DRAWINGS

The teaching of the present disclosure can be readily understood by considering the following detailed description in conjunction with the accompanying drawings, in which:

FIG. 3 illustrates a first screen display of the present disclosure;

To facilitate understanding, identical reference numerals have been used, where possible, to designate identical elements that are common to the figures.

DETAILED DESCRIPTION

The present disclosure broadly describes a method and apparatus for managing a network, e.g., a software tool that is deployed on an application server. Although the present disclosure is discussed below in the context of IP networks, e.g., an Internet Protocol (IP) Multimedia Subsystem (IMS) network, the present disclosure is not so limited. Namely, the present disclosure can be applied to packet networks in general, e.g., Voice over Internet Protocol (VoIP) networks, Service over Internet Protocol (SoIP) networks, and the like.

Figure 1:
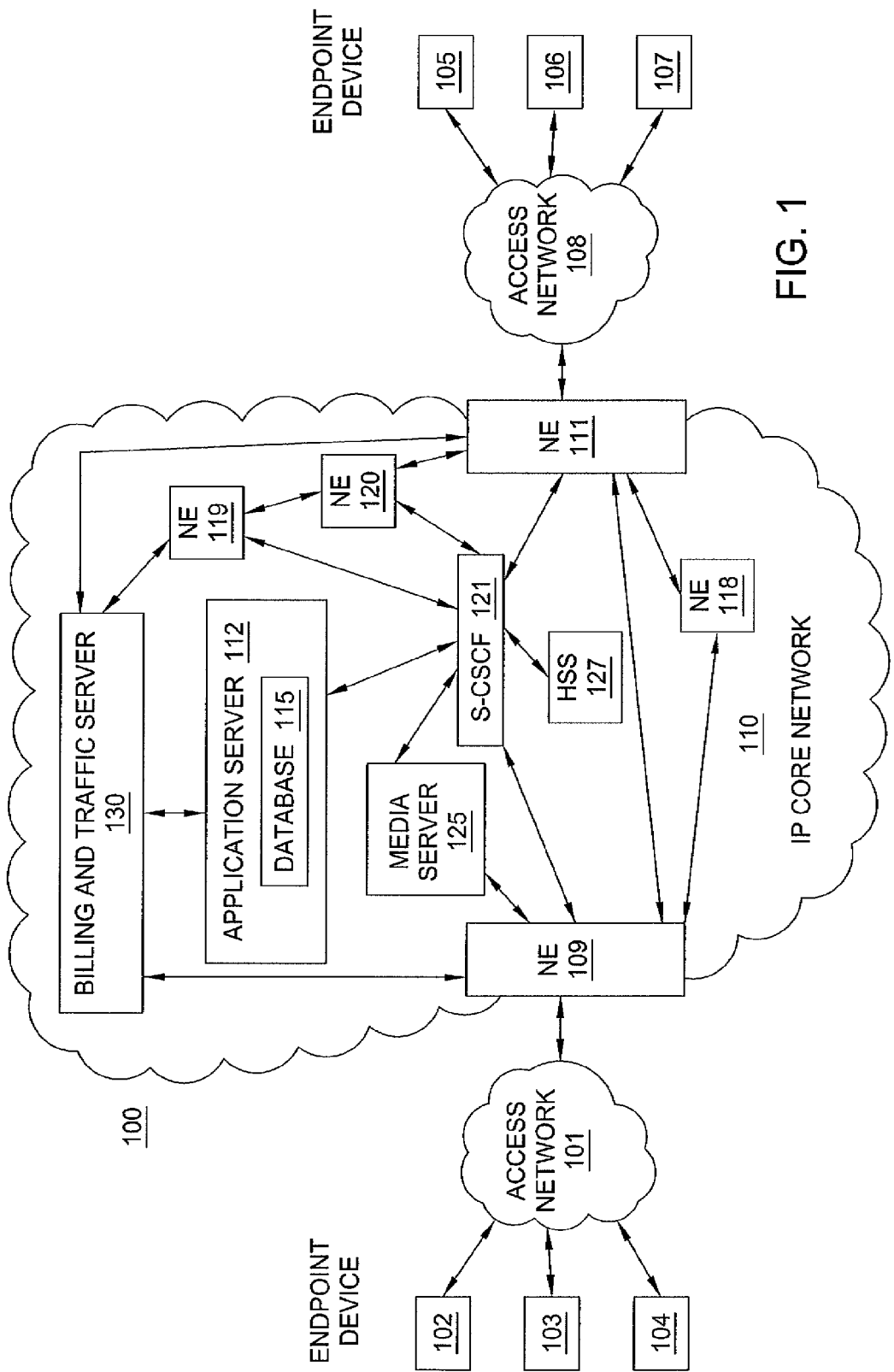
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, PBXs, aggregate endpoints (e.g., an aggregate endpoint that employs a SIP user agent to interact with the network on behalf of a plurality of endpoints aggregated behind it) and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network, a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an SIP URI, and so on. For example, the S-CSCF routes to a P-CSCF indicated by the SIP URI. The P-CSCF then routes to the SIP User Agent (UA) over a relationship that is established between the P-CSCF and the SIP UA which may represent an aggregate endpoint. This relationship could be a SIP trunk.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The billing and traffic server 130 (broadly a billing server) is a dedicated server that tracks communication traffic for the purpose of generating bills to the customers of the service provider. For example, the billing and traffic server 130 is capable of tracking a large number of call parameters such as and not limited to: the number of calls, the duration of calls, the calling party numbers, the called party numbers, the types of call, and so on. These call parameters are processed and accounted by the billing and traffic server 130 so that proper bills are generated and provided to the customers of the service provider.

In one embodiment, the network elements that are involved in supporting a call will provide call handling information to the billing and traffic server 130. For example, the border elements (e.g., 109, and 111) that support a media path between a calling party (e.g., endpoint device 102) and a called party (e.g., endpoint device 105) will provide one or more call detail records (CDRs) to the billing and traffic server 130 upon termination of the call. Broadly, a CDR is a record produced by a network element containing details of a call that passed through it. CDR records and Cause Codes conform to an industry standard format.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present disclosure.

The above IP network is only described to provide an illustrative environment in which packets for voice, data, and multimedia services are transmitted on IP Multimedia Subsystem (IMS) networks. In one embodiment, the IMS service provider may wish to implement a method that will manage the IP network in a manner that will allow the service provider to quickly identify a root cause responsible for a defect or a failure. More specifically, the method is able to assist a user in identifying a likely root cause that is within the core IP network, or the root cause may extend beyond the demarcation of the IP core network or platform. In other words, the root cause may exist in any segment of the call flow including one of the access networks, 101 or 108, or even within a customer-premise equipment situated at a customer site.

In one embodiment, a performance management and measurement system method, e.g., a software tool, is implemented in an application server, e.g., application server 112. In brief, the performance management and measurement method continuously gathers data in real time, parses the gathered data, and presents the parsed data in a user interface that allows detected defects to be quickly associated with a likely root cause. In other words, the necessary information associated with the one or more defects are automatically assembled and organized in a manner that will expedite the troubleshooting of any potential problems in near real time.

In one embodiment, the performance management and measurement system method deployed in application server 112 continuously obtain CDRs that are provided to the billing and traffic server 130. More specifically, the performance management and measurement system method does not interrupt the operation of the billing and traffic server 130, but simply copies the CDRs that are provided to the billing and traffic server 130 in real time via a separate or adjunct link. Using the CDRs, the performance management and measurement system method is able to quickly provide information that will lead to a potential root cause that is responsible for one or more defects. In fact, the performance management and measurement system method can be configured to provide automated alerts that are generated based on predefined thresholds, to providing trending, and to provide capacity management of network resources on the core IP network. These various functions will be further described below.

It should be noted that the present disclosure is not limited as to the manner in which the CDRs are delivered to the performance management and measurement system method. Namely, any methods in delivering the CDRs to the performance management and measurement system method are within the scope of the present disclosure.

Figure 2:
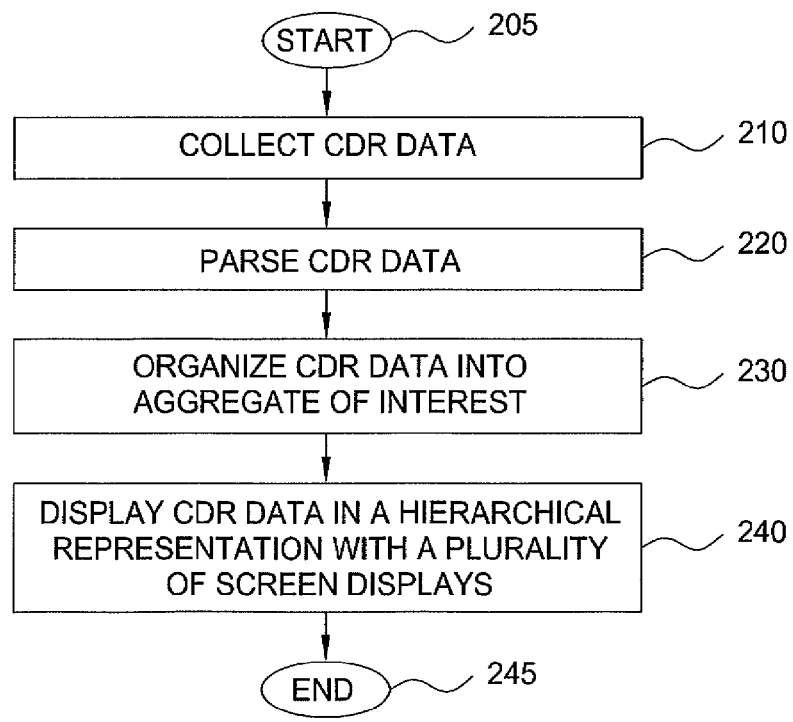
FIG. 2 illustrates a flowchart of a method for managing a network.

FIG. 2 illustrates a flowchart of a method 200 for managing a network. For example, the method 200 can be deployed in the application server 112 for processing CDRs. Method 200 starts in step 205 and proceeds to step 210.

In step 210, method 200 continuously collects CDRs from a plurality of network elements (e.g., 109, 111, 118-121, 125 and 130) within the core IP network 110. In one embodiment, the collection occurs in near real time, i.e., as the network elements are generating the CDRs for billing purposes. In other words, the CDRs are received as network elements are forwarding their CDRs to the billing and traffic server 130 for accounting purposes. This process of copying the CDRs is performed without interrupting the functions of the billing and traffic server 130 via an adjunct link. One advantage of this approach is the absence of having to reconfigure the functions performed by the various network elements. Namely, these network elements have already been pre-configured to forward their CDRs for billing purposes. The present method exploits this existing function to provide additional network management functionalities. Thus, the present method can readily be scaled up or down as the number of network elements are increased or decreased.

In one embodiment, the present method may receive CDRs from processing elements that are external to the core IP network. For example, border elements or core elements that are deployed within the access networks 101 and 108 may also forward CDRs to the performance management and measurement system method of the present disclosure. For example, the service provider of the core IP network may also be the same service provider for the access networks. Alternatively, the service providers of the core IP network and the access networks may simply have an agreement to share CDRs between the two service providers.

In step 220, method 200 parses the received CDR data based on various CDR parameters. It should be noted that each CDR comprises numerous industry standard CDR fields or parameters. To name only a few parameters for illustration, CDR parameters may comprise a cause code, a calling party area code, a calling party phone number, a called party area code, a called party phone number, a date of the call, a time stamp for the start of a call, a time stamp for the end of a call, a time duration of a call, a type of call, a direction of a call, a trunk group used by a call, a gateway used by a call, a node traversed by a call, and so on. It should be noted the above list is not exhaustive and is not representative of all CDR parameters that are currently provided in a CDR or any CDR parameters to be provided in the future for a CDR. For example, the method 200 may parse each CDR based on the cause code, the start time of a call and so on. This parsing will allow the performance management and measurement system method of the present disclosure to organize the parsed CDR data in a manner that will assist a user to quickly assess a potential root cause responsible for a detected defect or a group of defects as further discussed below.

In step 230, method 200 organizes the parsed CDR data into one or more aggregates of interest. For example, the parsed CDRs can be organized based on the cause code of a call, followed by the start time of a call and so on. In one embodiment, the parsed CDR data is pooled into aggregates of interest that are determined to be actionable. In other words, the parsed CDRs are pooled in a manner that will assist a user, e.g., a technician, to quickly determine whether an action is required based on a likely root cause as further described below.

In step 240, method 200 displays the organized CDR data in a hierarchical representation with a plurality of screen displays. In one embodiment, the organized CDR data is presented in a summary display screen (broadly a first display screen) showing detected defects (e.g., in terms of defect per million (DPM)) on a daily basis over a number of successive days, e.g., over a nine day period. In one embodiment, DPM results are calculated and displayed in two primary categories. For example, one category is "Platform" and the second category is "End-to-End Service". Platform measures defects found wholly on the service provider's network, while End-to-End Service measures defects that negatively impact the end-user, e.g., a customer, regardless of where the defect is found. In one embodiment, the summary display screen will also show the performance of the network at a fraction of day basis, e.g., on an hourly basis. Thus, in one screen display, a user is able to quickly see how the network is performing and see the level of service that customers are experiencing on a daily basis and on a fraction of a day basis.

In one embodiment, if the user notes a problem associated with a particular day or a particular time period of a day, the user may simply access the pertinent data by interacting with a field displayed on the summary display screen that will in turn, provide another screen display that will provide more details pertaining to that time period of interest. For example, the next display screen (broadly a second display screen) will provide additional call information based on cause codes associated with the selected time period, and the number of detected defects within each time period. In one embodiment, the activated field is implemented using a hyperlink that will lead to the next display screen. Again, if a field in the second display screen is activated, a next display screen (broadly a third display screen) will be provided that provides specific CDR data associated with each occurrence of a cause code. Thus, in one embodiment, the parsed CDR data is presented in a hierarchical manner such that in a mere "two clicks" by the user, the pertinent data that will assist a user in determining a potential root cause for one or more defects are immediately provided to the user. This will allow a user to quickly deal with any potential problem that will impact services provided to a particular customer. The information that is provided in the hierarchical representation will be discussed in greater details below.

In step 245, method 200 ends. It should be noted that method 200 can in fact proceed back to step 210. In other words, method 200 can be implemented to be a continuously running method.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application.

FIG. 3 illustrates a first screen display 300 of the present disclosure. In one embodiment, the first screen display 300 is a highest level screen display of a hierarchical representation of parsed CDR data. For example, the first screen display 300 comprises a first display portion 310 and a second display portion 320.

In one embodiment, the first display portion 310 presents performance data associated with a plurality of successive days 311, e.g., 9 days in an illustrative example (e.g., 3/31/09 (20090331) to 4/8/09 (20090408)). It should be noted that the first display portion 310 may comprise performance data for any "x" number of days and the variable "x" is not limited by the present illustrative example. Furthermore, in one embodiment, for each date, the first display portion 310 presents data associated with the number of call attempts per day 312, the number of defects per day 313, the defect per million associated with the core IP network of platform per day 314 and the defect per million associated with the service per day 315, i.e., that is external to the core IP network or platform.

To illustrate, on Apr. 2, 2009 (row 316), there were 4,652,165 call attempts made for that particular date, in which there were 949 detected defects. Based on this data, it was also determined that there were 309.198 DPM associated with the core IP network and 785.463 DPM associated with the service, i.e., attributed to events outside of the core IP network. Thus, the first display portion 310 is able to quickly present vital statistics in terms of DPMs to a user for a plurality of successive dates and measure Platform and End-to-End Service.

Furthermore, second display portion 320, provides additional information for each date based upon a fraction of a day, e.g., on an hourly basis as shown in FIG. 3. It should be noted that the second display portion 320 may comprise performance data for any "y" number of fractions of a day (e.g., every 2 hours, every 4 hours, etc.) and the variable "y" is not limited by the present illustrative example. Furthermore, in one embodiment, for each fraction of a day, the second display portion 320 presents data associated a call completion percentage.

To illustrate, on Apr. 2, 2009 (row 317), during the time period of hours (06-10) 318, the call completion percentages were below 100%. In fact, during the hour of 07, the call completion percentage was only 96.353 as shown in cell 319. Thus, the display screen 300 not only is able to present vital statistics in terms of DPMs to the user for a plurality of successive dates via the first display portion 310, the user is also able to quickly identify one or more time periods of any particular day that may have experienced a disproportionate amount of the defects via the second display portion 320.

In one embodiment, various thresholds can be selectively defined to trigger various alerts. For example, a threshold can be set e.g., at 200 DPM such that alerts will be sent to a user, e.g., a supervisor or a technician, to alert the user that there may be a potential problem, e.g., for dates of Apr. 2, 2009 and Apr. 7, 2009. For example, an email can be sent to the user, or a service ticket can be automatically triggered. Any number of alerting methods can be used in conjunction with the present disclosure. It should be noted that the threshold values can be selectively set based upon historical trend or are based upon the requirements of a particular deployment as defined by the service provider.

In one embodiment, the display screen can be color coded such that when the thresholds are crossed, various cells will be highlighted in different colors to quickly alert potential problems. For example, the cells for the date of Apr. 2, 2009 with the values of 309.198 and 785.463 will be highlighted in red (e.g., for a threshold of 300 DPM), whereas the cells for the date of Apr. 7, 2009 with the values of 203.991 and 203.991 will be highlighted in orange (e.g., for a threshold of 200 DPM), whereas the cells for the date of Apr. 1, 2009 with the values of 121.501 and 121.501 will be highlighted in yellow (e.g., for a threshold of 100 DPM), and so on. Again, the values used in the present example are only illustrative and should not be interpreted as a limitation of the present disclosure.

In one embodiment, a user may interact with any cell of the display screen 300 (e.g., clicking on the cell via a pointing device, such as using a mouse or a pointing pen on a touch screen display) to obtain additional information. In one embodiment, each cell is associated with a hyperlink such that another screen display will be presented upon activation of the hyperlink.

Figure 4:
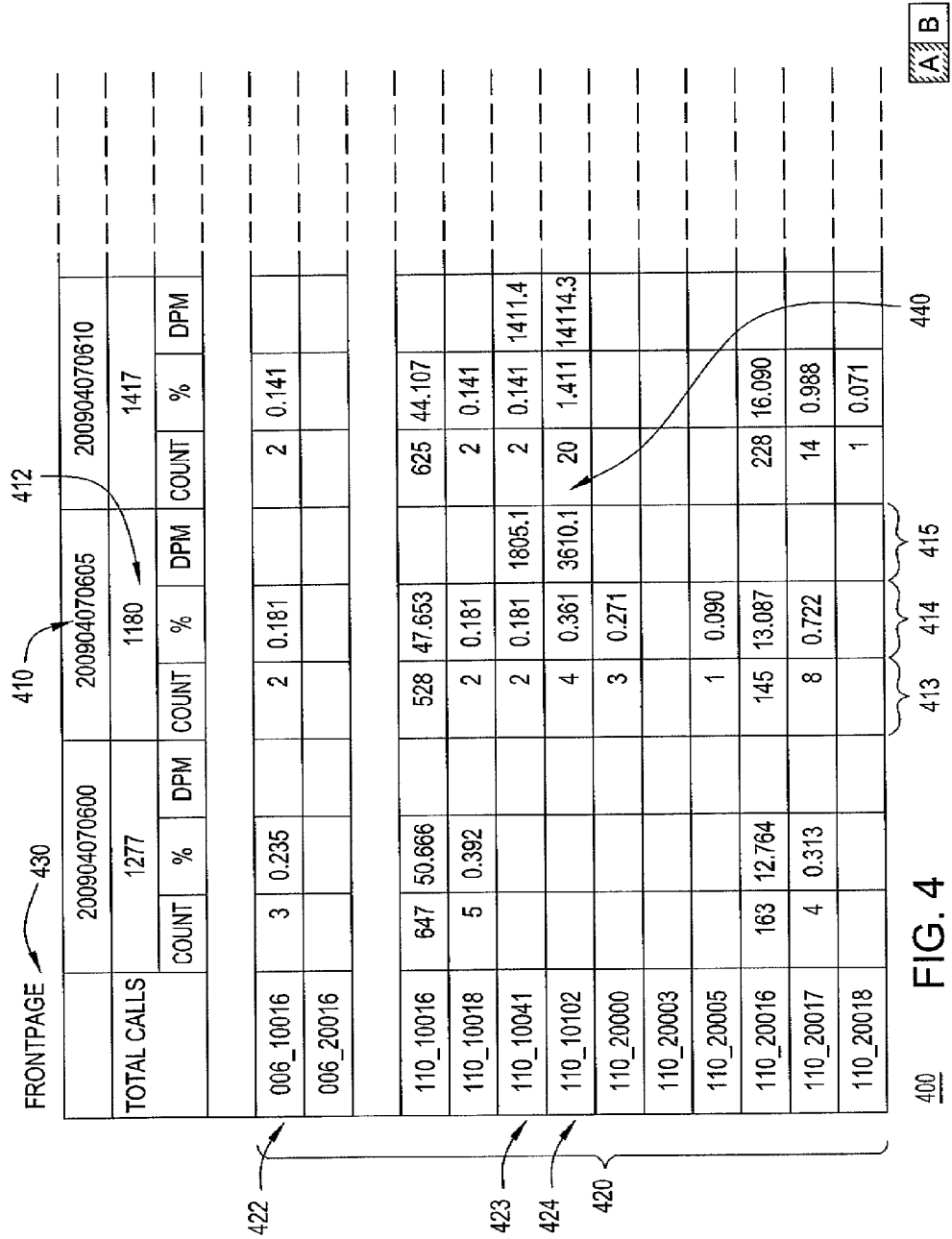
FIG. 4 illustrates a second screen display of the present disclosure.

FIG. 4 illustrates a second screen display 400 of the present disclosure. In one embodiment, the second screen display 400 is a second highest level screen display of a hierarchical representation of parsed CDR data.

In one embodiment, the second screen display 400 is organized in a grid format where the columns are in time increments and the rows are sorted based on cause codes. For example, the second screen display 400 illustrates the time period of 200904070605 (e.g., translated as Apr. 7, 2009 for the time period of 6:05 am to 6:10 am) in column 410. It should be noted that each column is illustrated in 5 minute interval up to an hour in this illustrative example. Thus, although not shown completely in FIG. 4, there are in fact 12 columns showing the time period of 6:00 am to 7:00 am for Apr. 7, 2009. In other words, if the user clicked on the cell 320 as shown in FIG. 3, the second screen display 400 as shown in FIG. 4 will be presented to the user showing greater call details pertaining to the hour of 6:00 am to 7:00 am.

In one embodiment, the rows of the second screen display 400 are organized or sorted based on cause codes 420. Broadly, a cause code, as an industry standard, provides information as to the disposition of a call attempt, e.g., the call was connected and terminated normally, the call was rejected, the called party was busy, the call attempt was blocked, and so on. It should be noted that there are numerous cause codes and the above short list is only illustrative.

In one embodiment, a hover capability is provided in the present disclosure. For example, given that there are numerous cause codes and that the user may not have committed the cause codes to memory, a user may simply direct a mouse pointer over one of the cause code and an explanation of the cause code will be immediately presented to the user. Thus, a user can quickly identify a cause code without having to memorize all possible cause codes. Furthermore, this hover capability can be implemented in other cells throughout all the different display screens that are discussed in the present disclosure. Furthermore, the hover capability can be selectively turned "on" or "off" based on the user preference.

In one embodiment, in each column immediately below the time period, a total call'attempt 412 is presented. For example, 1108 call attempts were made under the time period of 6:05 to 6:10 for Apr. 7, 2009.

In one embodiment, in each column immediately below the total call attempt value, three sub-columns 413-415 are provided. In sub-column 413, a count for this time period for a particular cause code is provided. In sub-column 414, a percentage of the DPM attributable to a particular cause code for this time period is presented. In sub-column 415, a DPM attributable to a particular cause code for this time period is presented. It should be noted that only a subset of cause codes will be considered to be representative of potential defects as defined by a service provider. For example, cause code of "006_10016" in row 422 is not considered to represent a defect in this particular example. As such, although there are occurrences of 006_10016 in various time periods shown in FIG. 4, they do not contribute to the DPM calculations. On the other hand, cause code "110_10102" is considered to represent a defect in this particular example. As such, occurrences of 110_10102 in various time periods shown in FIG. 4, do contribute to the DPM calculations.

In one embodiment, color codes can be employed to highlight certain cells that are counted as defects. For example, cells associated with the cause code of 110_10102 will be highlighted in a red color. For example, the cells on row 423 (with values of 0.181, and 1805.1 in time period 2009040705), (with values of 0.141, and 1411.4 in time period 200904070610), and (with values 0.415, and 4153.7 in time period 200904070625) will be highlighted in red. Again, this allows a user to quickly identify cause codes that are contributing to the DPM for a particular date. However, in this display screen, the user is directed to a particular time period of the day.

In one embodiment, the user may quickly return to the highest display screen by clicking on link 430. Furthermore, the user may also access help information by clicking on link 432 to obtain instructions or explanation in the use of the information presented in the second display screen.

In one embodiment, the user may note that a particular cause code illustrated in FIG. 4 is causing a high DPM, e.g., cause code "110_10102" on row 424. In fact, in cell 440, there is a relatively high count of "20" that occurred for the time period of 200904070610. If the user is interested in the information contributing to the 20 counts of the cause code, the user can simply click on the cell 440, where a third display screen is presented to the user as illustrated in FIG. 5 below.

Figure 5:
FIG. 5 illustrates a third screen display of the present disclosure.
Figure 5:

FIG. 5 illustrates a third screen display 500 of the present disclosure. In one embodiment, the third screen display 500 is a third highest level screen display of a hierarchical representation of parsed CDR data. For example, the third screen display 500 is displayed via a hyperlink when a cell is activated in the second screen display 400.

In one embodiment, the third screen display 500 is organized in a grid format, where the rows are organized based on each count of a particular cause code and each column contains performance data associated with the cause code parsed from CDR data. In accordance with the above example, if cell 440 is clicked on by the user, the third screen display 500 will display the 20 occurrences on column 501 associated with the cause code 110__10102.

In one embodiment, the third screen display 500 provides a plurality of performance data in a plurality of columns 502-519. For example, for each occurrence, column 502 illustrates a physical location code of a node that the call traversed, e.g., the node is situated in Philadelphia, Pa. (Ph3). It should be noted that node locations are based on the physical locations of the nodes that the service provider have deployed equipment and, therefore are not limited to any particular physical locations.

Column 503 illustrates a direction of a call code, e.g., "110" illustrates an outbound call, whereas another code, e.g., "100" is used to represent an inbound call.

Column 504 illustrates a code as to whether a call was answered. Namely, the code indicates whether a called party answered the call. In one embodiment, a value of "0" represents the call was not answered and a value of "1" represents a call was answered.

Column 505 illustrates an area code of an originating call, and column 506 illustrates the phone number of an originating call. Similarly, column 508 illustrates an area code of called number, and column 509 illustrates the phone number of the called number. To illustrate, in row 1, the calling party number is 815-777-7777, and the called party number is 314-777-7777.

Column 507 illustrates a code as to whether the call was an oversea call. In one embodiment, a value of "0" indicates that the call is not an oversea call, whereas a value of "1" indicates that the call is an oversea call.

Column 510 illustrates a time stamp for the start of the call, whereas column 512 illustrates a time stamp for the end of the call. In turn, column 511 illustrates a duration of the call.

Column 513 illustrates an inbound trunk group code for the call. Similarly, column 514 illustrates an outbound trunk group code for the call.

Column 515 illustrates a Carrier Identification Code (CIC) code for the call. For example, the CIC code refers to a numeric code assigned by the North American Numbering Plan (NANP) Administrator for the provisioning of selected switched services. The numeric code is unique to each entity and is used by the telephone company to route the call to the trunk group designated by the entity to which the code was assigned.

Column 516 illustrates a code for a particular piece of equipment at a particular location. For example, PH-1-09 may represent a piece of equipment located at Philadelphia, at node "1" for card "9", and so on.

Column 517 illustrates a media gateway code that indicates a gateway that serviced the call. Column 518 illustrates a session border controller code that indicates a session border controller that serviced the call. More specifically, column 518 may also identify whether the call is inbound or outbound relative to the session border controller.

Column 519 illustrates the customer ID code. For example, the call may be associated with an individual customer or it may be associated with an enterprise customer.

Finally, the third display screen contains a link 530 that allows a user to view the actual raw CDR data in a fourth display screen that was parsed to obtain the performance data as displayed in FIG. 5. This will allow the user to obtain additional information to ascertain a potential root cause. It should be noted that although most of the information presented in the various display screens are derived directly from the CDR data, the present method may also optionally correlate additional information from other sources, e.g., information obtained from the billing server 130.

It should be noted that FIGS. 3-5 illustrate the ease with which a user can quickly ascertain a potential problem by way of applying two clicks of an input device. As demonstrated, the first screen display provides DPM calculations for each day with call completion percentages for fractional time periods for each date. The second screen display provides cause codes associated with a plurality of finer time periods, whereas the third screen display provides performance data associated with each occurrence of the pertinent cause code that contributed to the DPM calculation.

To illustrate, a user may evaluate FIG. 5 to ascertain whether there is a commonality among the 20 entries to determine a likely root cause. In FIG. 5, it is shown that all the entries pertain to the same inbound trunk group "007000". Thus, the user may immediately evaluate whether there is a failure associated with inbound trunk group "007000". It should be noted that the user is able to arrive to this conclusion very quickly. However, it does not necessarily mean that the failure lies in inbound trunk group "007000", but the user is quickly guided to a starting point to maximize the likelihood of arriving at the root cause quickly. For example, if all entries relates to a single called number, then the root cause may likely be associated with a failure of that particular line. In another example, if all entries relates to a particular gateway, then the root cause may likely be associated with a failure of that particular gateway. In yet another example, if all entries relates to a particular enterprise customer, then the root cause may likely be associated with a failure of a customer premise equipment, e.g., an IP PBX deployed by that particular enterprise customer, and so on.

In sum, the present performance management and measurement system method is able to collect and parse the CDR data in a manner that greatly assists a user to quickly identify any potential problems, e.g., whether the problem is a core IP network problem or a problem that is external to the core IP network. More importantly, the parsed CDR data is organized and presented in a manner that will also assist the user to quickly troubleshoot the problem down to a root cause.

Additionally, the present performance management and measurement system method is able to provide trending and capacity management. For example, the user may realize that there is an elevated amount of call attempts that are not being incurred at a particular time of the day, at a particular physical location, at a particular media gateway, at a particular session border controller, and so on. By monitoring the trends, the user may alert the service provider to provision additional network resources in a more efficient manner, e.g., by specifying the physical location that equipment should be deployed, by specifying the time of day, by specifying a particular trunk group, by identifying a particular enterprise customer, and so on.

Figure 6:
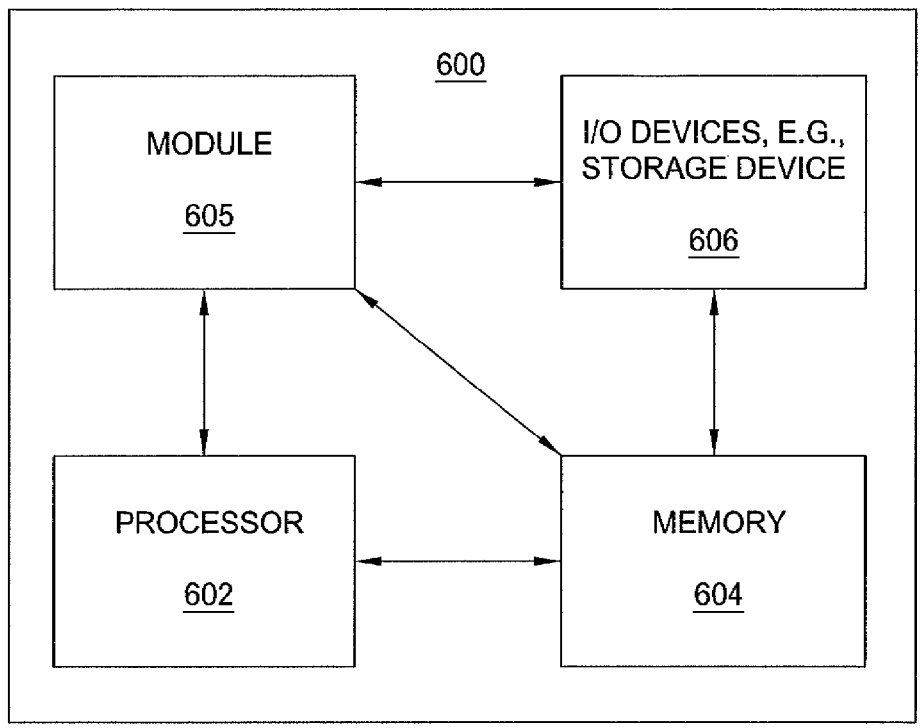
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for managing a network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 605 for managing a network can be loaded into memory 604 and executed by processor 602 to implement the functions as discussed above. As such, the present method 605 for managing a network (including associated data structures) of the present disclosure can be stored on a computer readable storage medium (e.g., a non-transitory medium), e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing a network, comprising:
   collecting, by a processor, a plurality of call detail records;
   organizing, by the processor, a plurality of parameters of the call detail records in accordance with a plurality of cause codes, wherein each of the plurality of cause codes provides information regarding a disposition of a call attempt; and
   displaying, by the processor, the plurality of parameters of the call detail records in a hierarchical representation comprising a plurality of screen displays, wherein a first screen display of the plurality of screen displays presents a first defect per million calculation associated with a core internet protocol network for a day, and a second defect per million calculation associated with a service that is external to the core internet protocol network for the day, wherein a second screen display of the plurality of screen displays is presented upon an activation of a cell located in the first screen display, wherein the second screen display presents the plurality of cause codes for a plurality of time periods within the day, wherein the second screen display comprises a plurality of columns associated with the plurality of time periods within the day and a plurality of rows associated with the plurality of cause codes, where each column of the plurality of columns includes a plurality of sub-columns, the plurality of sub-columns comprising at least a first sub-column for displaying a defects per million measure associated with each of the plurality of cause codes and associated with the one of the plurality of time periods that is associated with the column.

2. The method of claim 1, wherein the first screen display of the plurality of screen displays further presents a completion percentage of calls for each of a plurality of fractions of the day.

3. The method of claim 2, wherein each fraction of the plurality of fractions comprises an hour.

4. The method of claim 1, wherein a third screen display of the plurality of screen displays is presented upon an activation of a cell located in the second screen display.

5. The method of claim 4, wherein the third screen display presents for one of the plurality of cause codes the plurality of parameters of the call detail records.

6. The method of claim 5, wherein a fourth screen display of the plurality of screen displays is presented upon an activation of a link located in the third screen display, wherein the fourth screen display presents raw call detail record data associated with the plurality of parameters of the call detail records.

7. The method of claim 5, wherein the plurality of parameters of the call detail records comprise at least two of: a physical location code, a direction of a call code, a call answered code, an area code of an originating call, a phone number of the originating call, an area code of called number, a phone number of the called number, an oversea call code, a time stamp for a start of a call, a time stamp for an end of the call, a duration of the call, an inbound trunk group code, an outbound trunk group code, a carrier identification code, a code for a particular piece of equipment at a particular location, a media gateway code, a session border controller code and a customer identifier code.

8. The method of claim 1, wherein the processor comprises a processor of an application server.

9. A non-transitory computer-readable storage medium storing instructions which, when executed by a processor, cause the processor to perform operations for managing a network, the operations comprising:
   collecting a plurality of call detail records;
   organizing a plurality of parameters of the call detail records in accordance with a plurality of cause codes, wherein each of the plurality of cause codes provides information regarding a disposition of a call attempt; and
   displaying the plurality of parameters of the call detail records in a hierarchical representation comprising a plurality of screen displays, wherein a first screen display of the plurality of screen displays presents a first defect per million calculation associated with a core internet protocol network for a day, and a second defect per million calculation associated with a service that is external to the core internet protocol network for the day, wherein a second screen display of the plurality of screen displays is presented upon an activation of a cell located in the first screen display, wherein the second screen display presents the plurality of cause codes for a plurality of time periods within the day, wherein the second screen display comprises a plurality of columns associated with the plurality of time periods within the day and a plurality of rows associated with the plurality of cause codes, where each column of the plurality of columns includes a plurality of sub-columns, the plurality of sub-columns comprising at least a first sub-column for displaying a defects per million measure associated with each of the plurality of cause codes and associated with the one of the plurality of time periods that is associated with the column.

10. The non-transitory computer-readable storage medium of claim 9, wherein the first screen display of the plurality of screen displays further presents a completion percentage of calls for each of a plurality of fractions of the day.

11. The non-transitory computer-readable storage medium of claim 9, wherein a third screen display of the plurality of screen displays is presented upon an activation of a cell located in the second screen display, wherein the third screen display presents for one of the plurality of cause codes the plurality of parameters of the call detail records.

12. An apparatus for managing a network, comprising:
a processor; and
a computer-readable medium storing instructions which, when executed by the processor, cause the processor to perform operations, the operations comprising:
collecting a plurality of call detail records;
organizing a plurality of parameters of the call detail records in accordance with a plurality of cause codes, wherein each of the plurality of cause codes provides information regarding a disposition of a call attempt; and
displaying the plurality of parameters of the call detail records in a hierarchical representation comprising a plurality of screen displays, wherein a first screen display of the plurality of screen displays presents a first defect per million calculation associated with a core internet protocol network for a day, and a second defect per million calculation associated with a service that is external to the core internet protocol network for the day, wherein a second screen display of the plurality of screen displays is presented upon an activation of a cell located in the first screen display, wherein the second screen display presents the plurality of cause codes for a plurality of time periods within the day, wherein the second screen display comprises a plurality of columns associated with the plurality of time periods within the day and a plurality of rows associated with the plurality of cause codes, where each column of the plurality of columns includes a plurality of sub-columns, the plurality of sub-columns comprising at least a first sub-column for displaying a defects per million measure associated with each of the plurality of cause codes and associated with the one of the plurality of time periods that is associated with the column.

13. The method of claim 8, wherein the collecting of the plurality of call detail records comprises:
interacting with a billing server.

* * * * *